United States Patent
Vielsack

(10) Patent No.: US 10,703,898 B2
(45) Date of Patent: Jul. 7, 2020

(54) THERMOPLASTIC ELASTOMER COMPOSITION FOR ADHESION TO CROSSLINKED DIENE RUBBERS

(71) Applicant: KRAIBURG TPE GmbH & Co. KG, Waldkraiburg (DE)

(72) Inventor: Frieder Vielsack, Waldkraiburg (DE)

(73) Assignee: Kraiburg TPE GmbH & Co. KG, Waldkraiburg (DE)

( * ) Notice: Subject to any disclaimer, the term of this patent is extended or adjusted under 35 U.S.C. 154(b) by 16 days.

(21) Appl. No.: 15/672,918

(22) Filed: Aug. 9, 2017

(65) Prior Publication Data

US 2018/0051166 A1 Feb. 22, 2018

(30) Foreign Application Priority Data

Aug. 17, 2016 (DE) .................. 10 2016 115 271
Jun. 2, 2017 (DE) .................. 10 2017 112 243

(51) Int. Cl.
    *C08L 53/02* (2006.01)
(52) U.S. Cl.
    CPC ............ *C08L 53/02* (2013.01); *C08L 53/025* (2013.01); *C08L 2205/03* (2013.01); *C08L 2205/035* (2013.01)
(58) Field of Classification Search
    CPC .... C08L 53/02; C08L 53/025; C08L 2205/03; C08L 2205/035
    See application file for complete search history.

(56) References Cited

U.S. PATENT DOCUMENTS

| | | | |
|---|---|---|---|
| 2002/0004558 A1 | 1/2002 | Masubuchi | |
| 2002/0077409 A1* | 6/2002 | Sakaki | ............... C08K 5/01 524/496 |
| 2008/0319116 A1* | 12/2008 | Fredrickson | ............ C08J 3/075 524/424 |
| 2010/0305272 A1 | 12/2010 | Nagaoka et al. | |

FOREIGN PATENT DOCUMENTS

| | | |
|---|---|---|
| CN | 1218817 | 6/1999 |
| DE | 10 2006 002759 A1 | 7/2007 |

OTHER PUBLICATIONS

F. Röthemeyer et al., "Kautschuktechnologie [Rubber Technology]," chapters 2.1 to 2.9., Carl Hanser Verlag Munich (2006), 2nd edition.
F. Röthemeyer et al., Kautschuktechnologie [Rubber Technology], chapters 3.2.1. to 3.2.2.9., Carl Hanser Verlag Munich (2006), 2nd edition.
G. Abts, "Einführung in die Kautschuktechnologie [Introduction to Rubber Technology]," pp. 53 et seq., Carl Hanser Verlag Munich (2007).
European Search Report issued in EP 17 185 884.8, which is a Counterpart application of this application, dated Jan. 3, 2018.
Office action by the Chinese patent office (SIPO) issued in CN 201710706710.X, which is a Counterpart application of this application, dated Jun. 4, 2019.

* cited by examiner

*Primary Examiner* — Patrick D Niland
(74) *Attorney, Agent, or Firm* — Thrive IP®; George Hasselmann

(57) ABSTRACT

A thermoplastic elastomer composition (TPE composition) with an improved adhesion to rubber based on cross-linked diene rubber mixtures is disclosed. The rubbers are preferably sulphur-cross-linkable and selected from the group natural rubber (NR), isoprene rubber (IR), butadiene rubber (BR), styrene-butadiene rubber (SBR), chloroprene rubber (CR), acrylonitrile butadiene rubber (NBR), butyl rubber (IIR) or ethylene propylene diene rubber (EPDM). In addition, the use of the thermoplastic elastomer composition for producing a composite material with a rubber, as well as an article that includes a thermoplastic elastomer composition and a rubber are disclosed. Further, a process for producing a thermoplastic elastomer composition is also disclosed.

16 Claims, No Drawings

THERMOPLASTIC ELASTOMER COMPOSITION FOR ADHESION TO CROSSLINKED DIENE RUBBERS

CROSS-REFERENCE TO RELATED APPLICATIONS

This application claims priority to German application DE 10 2016 115 271.4, filed Aug. 17, 2016, and to German application DE 10 2017 112 243.5, filed Jun. 2, 2017, the entire contents thereof are incorporated herein by reference.

TECHNICAL FIELD

The present invention relates to a thermoplastic elastomer composition (TPE composition) with an improved adhesion to rubber based on cross-linked diene rubber mixtures, the rubbers of which are preferably sulphur-cross-linkable, preferably selected from the group natural rubber (NR), isoprene rubber (IR), butadiene rubber (BR), styrene-butadiene rubber (SBR), chloroprene rubber (CR), acrylonitrile butadiene rubber (NBR), butyl rubber (IIR) or ethylene propylene diene rubber (EPDM). By the term "diene rubber" is meant below the group of the named sulphur-cross-linkable rubbers NR, IR, BR, SBR, CR, NBR, IIR or EPDM. Furthermore, by the term "rubber" is meant hereafter the cross-linked diene rubbers described. In addition, the present invention also relates to the use of the thermoplastic elastomer composition according to the invention for producing a composite material with a rubber, as well as an article that comprises a thermoplastic elastomer composition according to the invention and a rubber. The present invention also relates to a process for producing a thermoplastic elastomer composition.

BACKGROUND

In the state of the art, some thermoplastic elastomer (TPE) variants are to be found, which are used for adhesion to cross-linked diene rubber, especially EPDM. These are, on the one hand, TPEs based on EPDM/polypropylene (PP) and, on the other hand, TPEs based on styrene block copolymers (SBC). Both types are known and are used in different applications. A preferred use of the variants is adhesion to cross-linked EPDM. Cross-linked EPDM is used for example as seal running around the area of the window pane on motor vehicle side doors. For technical production reasons the seal used for this is not already produced as a ring-shaped band, but as an interrupted band. However, in order that the seal running around along the window pane of a motor vehicle door is tight, both ends of the band must be tightly connected to each other. Until now this has frequently been achieved with one of the named TPEs. It is however known in the case of both the named TPE variants that they have both advantages and disadvantages.

Furthermore, it is also possible to vulcanize rubber onto rubber. For example, for this, the seal consisting of cross-linked EPDM is tightly connected at both ends with EPDM instead of TPE. In other words, EPDM is vulcanized onto the seal. This method has the disadvantage of long cycle times in comparison with the method with the TPE variants.

The TPEs used until now thus already exhibit a bleeding-out of plasticizers after a short period of weathering or irradiation with UV light. This bleeding-out, also alternatively called oiling-out, leads to unsightly black streaks on the paintwork due to leaked-out constituents washed down with rainwater, particularly in the case of light-coloured motor vehicles.

The TPE variant EPDM/PP furthermore has the disadvantage of only achieving good adhesion results on cross-linked EPDM at very high temperatures greater than 270° C. The process is therefore very energy-intensive, and at the same time the cooling time required and thus the cycle time are increased due to the high processing temperature.

The TPE variant based on SBC, with good adhesion, has the disadvantage of being sticky vis-à-vis glass or exhibiting a high degree of friction vis-à-vis glass. When used in motor vehicle window pane seals, this can become a disadvantage as there is a direct contact with the glass pane and the pane also moves over the TPE. The friction is increased by weathering and UV exposure which the motor vehicle experiences due to natural, external influences; the SBC material slowly becomes sticky. In order to achieve a sufficient adhesion to EPDM, low-molecular-weight (sticky) SBCs are used, which have the disadvantage that, in the course of time, they migrate onto the surface. It has been shown that, in the course of time, the friction vis-à-vis glass is further increased.

SUMMARY

An object of the present invention was therefore to provide a thermoplastic elastomer composition which does not exhibit the named disadvantages, or only to a very slight extent, in particular to provide a composition which has a permanent adhesion to rubber surfaces, especially cross-linked EPDM surfaces, is suitable for external use, and exhibits a low degree of friction as well as no bleeding-out of plasticizers.

In order to achieve the named object, the present invention provides a thermoplastic elastomer composition, which comprises a styrene block copolymer (SBC) with an average molecular weight of more than 70,000 g/mol, a double bond-containing polymer with a molar proportion of double bonds in the range from 5 to 95 mol.-% relative to the monomer units of the polymer, and a non-elastomeric polyolefin.

DESCRIPTION OF EXEMPLARY EMBODIMENTS

The SBC used according to the invention can be a double bond-containing or double bond-free SBC, wherein however a double bond-free SBC is advantageous. These double bond-free SBCs are also familiar to a person skilled in the art as hydrogenated SBCs. For reasons of better UV resistance it is preferred that the SBC has no double bonds. In other words the SBC is preferably a hydrogenated SBC. The SBC is preferably a linear triblock copolymer. It is preferred that in addition to at least one polystyrene block, the SBC contains at least one polyolefin block, preferably an ethylene/propylene, ethylene/butylene or isobutylene block. Quite particularly preferably, the SBC is an SEBS (polystyrene-block-poly(ethylene-co-butylene)-block-polystyrene), an SEEPS (polystyrene-block-poly(ethylene-co-(ethylene-propylene))-block-polystyrene), an SEPS (polystyrene-block-poly(ethylene-co-propylene)-block-polystyrene) or an SiBS (polystyrene-block-polyisobutylene-block-polystyrene), particularly preferably an SEBS. Preferred examples of SBCs that can be used according to the invention are described below.

The average molecular weight of the SBC preferably lies in the range from more than 70,000 g/mol to 1,000,000 g/mol, more preferably in the range from 100,000 g/mol to 500,000 g/mol and most preferably in the range from 200,000 g/mol to 400,000 g/mol. According to the invention, the present application always refers to the number average molecular weight $M_n$. The advantage of the high molecular weight of the SBC is that TPEs based on such polymers have a lower tendency to oiling-out of the plasticizers. Thus the surface is drier and the friction lower.

However, in order to make possible an excellent adhesion to cross-linked diene rubber mixtures, the thermoplastic elastomer composition according to the invention further contains a double bond-containing polymer. The inventors of the present invention assume that the double bonds of this double bond-containing polymer can react with excess, unreacted sulphur atoms of sulphur or sulphur-containing compounds from the cross-linking system of the cross-linked diene rubber mixture and thus improve the adhesion.

The double bond-containing polymer is preferably a non-hydrogenated styrene block copolymer or a sulphur-cross-linkable, uncross-linked diene rubber, preferably SIS, uncross-linked EPDM or isoprene rubber (IR).

If the double bond-containing polymer is a non-hydrogenated SBC, it is preferred that it has a molar proportion of double bonds in the range from 50 to 90 mol.-%, more preferably 60 to 85 mol.-% relative to the monomer units of the SBC.

It is preferred that in addition to at least one polystyrene block, the SBC contains at least one polyolefin block. Particularly preferably, the non-hydrogenated SBC is a linear triblock copolymer, selected from the group SBS (polystyrene-block-polybutadiene-block-polystyrene), SIS (polystyrene-block-polyisoprene-block-polystyrene) and SIBS (polystyrene-block-poly(isoprene-co-butadiene)-block-polystyrene). Quite particularly preferably, the double bond-containing polymer is an SIS.

It is preferred in the composition according to the invention that the SBC and the double bond-containing polymer are different polymers.

If the double bond-containing polymer is a sulphur-cross-linkable, uncross-linked diene rubber, it is preferred that this has a molar proportion of double bonds in the range from 5 to 40 mol.-%, more preferably 7 to 20 mol.-% relative to the molar number of monomer units of the polymer. Particularly preferably, the double bond-containing polymer is an uncross-linked EPDM or isoprene rubber (IR).

The double bond-containing polymer is preferably present uncross-linked in the TPE according to the invention.

Furthermore it is preferred that, for the production of an excellent adhesion to cross-linked diene rubber mixtures, these have sulphur or sulphur-containing compounds as cross-linking system.

It is further preferred that, for the production of an excellent adhesion, excess sulphur or sulphur-containing compounds of the cross-linked diene rubber mixtures are reacted with the double bond-containing polymer according to the invention.

The non-elastomeric polyolefin in the TPE composition according to the invention is preferably a thermoplast. Examples thereof are described below.

Furthermore, the TPE composition according to the invention can have a phenolic resin. The presence of a phenolic resin can further increase the properties of adhesion to rubber of the TPE composition according to the invention. It is assumed that the reason for this lies in the reaction of the phenolic resin with remaining, unreacted double bonds of the cross-linked diene rubber of the rubber on the one hand, and with double bonds in the double bond-containing polymer of the TPE composition according to the invention on the other hand. In other words, it is assumed that cross-linking takes place between the interfaces of the TPE composition according to the invention and the rubber. This is preferably possible when, after the production of the rubber by cross-linking of the diene rubber mixture, double bonds that are still unreacted remain, which can be reacted preferably by means of phenolic resins. For this, the phenolic resin preferably has at least two units which can react with double bonds. In this way, the phenolic resin can react with one of the units with a double bond in the cross-linked diene rubber and with another of the units with a double bond in the double bond-containing polymer of the TPE and form a connection. The phenolic resin can thus serve as a bridge between the composition according to the invention and the rubber article. Phenolic resins that can be used according to the invention are also described below.

The composition according to the invention can furthermore contain a plasticizer which serves to keep the composition soft, in order to improve the function as seal. Despite the presence of a plasticizer, the composition according to the invention does not tend towards oiling-out of the plasticizer, as the SBC used according to the invention with the average molecular weight of more than 70,000 g/mol is suited to preventing this. Plasticizers that can be used according to the invention are also listed below.

Furthermore, the composition according to the invention can also have a cross-linking auxiliary material which serves to accelerate or catalyze the reaction between the double bonds of the double bond-containing polymer and the excess sulphur or sulphur-containing compound of the cross-linked diene rubber mixture.

The composition according to the invention can also contain one or more of the following additives: molecular sieves, stabilizers, auxiliary materials and dyes. The composition according to the invention can also contain fillers. Examples of additives and fillers are also named below.

The composition according to the invention has improved adhesion vis-à-vis rubber. The rubber preferably consists of cross-linked diene rubber mixtures which can be cross-linked by means of sulphur or sulphur-containing compounds. Those based on NR, IR, BR, SBR, CR, NBR, IIR or EPDM rubber are named as sulphur-cross-linkable diene rubber mixtures. The rubber mixture here preferably consists of NBR and EPDM rubber and quite particularly preferably of EPDM rubber.

It is known to a person skilled in the art that, in addition to the rubber, a rubber mixture contains further ingredients such as for example fillers, plasticizers, processing agents, stabilizers such as antioxidants, anti-UV agents, antiozonants and the cross-linking system (also called vulcanization system) as well as other additives such as for example adhesion promoters, propellants, flame retardants. In this connection, see also "G. Abts, Einführung in die Kautschuktechnologie [Introduction to Rubber Technology], Carl Hanser Verlag Munich (2007), p. 53 et seq.".

The TPE composition according to the invention adheres to cross-linked diene rubber mixtures, the vulcanization system of which is based on sulphur and/or sulphur-containing cross-linking chemicals. Cross-linking chemicals based on sulphur and sulphur-containing systems, as also the mechanisms thereof are sufficiently known to a person skilled in the art. Reference may be made in this connection to "F. Röthemeyer, F. Sommer, Kautschuktechnologie [Rubber Technology], Carl Hanser Verlag Munich (2006), 2nd edition, chapters 3.2.1. to 3.2.2.9. inclusive". Reference may further be made to the fact that the TPE composition according to the invention also adheres to cross-linked diene rubber mixtures with peroxidic vulcanization systems. However, it has been shown that this adhesion is less than that with which the rubber mixture has been cross-linked by means of sulphur and/or sulphur-containing cross-linking systems. It is therefore preferred that the rubber to which the TPE composition according to the invention is intended to adhere has been cross-linked by means of sulphur and/or sulphur-containing cross-linking systems. Particularly preferably, after the vulcanization of the rubber, free unreacted sulphur and/or sulphur compounds are still present in the rubber.

The present invention also relates to the use of a thermoplastic elastomer composition according to the invention for producing a composite material/article with rubber, wherein the rubber is based on a sulphur-cross-linkable, cross-linked diene rubber mixture from the group of NR, IR, BR, SBR, CR, NBR, IIR or EPDM or respectively for the adhesion of the thermoplastic elastomer composition according to the invention to a rubber. NBR and EPDM are preferred as rubber, EPDM is quite particularly preferred. In other words, the present invention also relates to a process for producing an article, e.g. in the form of a composite material, made of the thermoplastic elastomer composition according to the invention and a rubber, wherein the thermoplastic elastomer composition is combined with a rubber. In the use according to the invention or the process according to the invention, injection moulding, multi-component injection moulding, injection moulding around inserts, extrusion or compression moulding is used as processing method for producing the articles, wherein injection moulding, injection moulding around inserts and extrusion are preferred, and injection moulding around inserts is quite particularly preferred. In the use or process according to the invention, it is preferred that, for producing the composite material/article, the rubber has a relatively fresh interface at the point to be connected, i.e. it is preferred that the interface is not older than 2 h, preferably not older than 1 h. In this way, it is guaranteed that both sulphur and/or sulphur-containing compounds and the unreacted (uncross-linked) free double bonds of the vulcanized diene rubber mixture are available at the surface for adhesion with the composition according to the invention.

Thus the present invention also relates to an article, e.g. in the form of a composite material, made of a thermoplastic elastomer composition according to the invention and a rubber.

By an "EPDM rubber" is meant herein an ethylene propylene diene rubber which is a terpolymer, synthetic rubber. EPDM belongs to the random copolymers with saturated polymer main chain framework and double bonds in the side chain, which can serve to cross-link the EPDM rubber in the rubber mixture by means of the vulcanization system. The production of EPDM preferably takes place with metallocene or Ziegler-Natta catalysts based on vanadium compounds and aluminium alkyl chlorides. As diene, unconjugated dienes are used, only one double bond of which takes part in the polymer chain formation, with the result that further double bonds remain outside the direct basic chain framework and can be cross-linked with sulphur peroxidically or phenolically. As diene component, dicyclopentadiene (DCP), 1,4-hexadiene or ethylidene norbornene (ENB, IUPAC: 5-ethylidene-2-norbornene) are used. The dienes differ with respect to the cross-linking speed. DCP has the lowest, ENB the highest reactivity. The EPDM is preferably one which has been cross-linked with sulphur. In this way, bonds of the composition according to the invention to the sulphur atoms can be built up.

EPDM, as also all the other sulphur cross-linkable rubbers named in this invention, NR, IR, BR, SBR, CR, NBR, IIR are described in detail in chapters 2.1. to 2.9. inclusive of "F. Röthemeyer, F. Sommer, Kautschuktechnologie [Rubber Technology], Carl Hanser Verlag Munich (2006), 2nd edition". Reference is made to this in full.

The present invention also relates to a process for producing a thermoplastic elastomer, wherein a styrene block copolymer (SBC) with an average molecular weight of more than 70,000 g/mol, a double bond-containing polymer with a molar proportion of double bonds in the range from 5 to 95 mol.-% relative to the monomer units of the polymer, and a non-elastomeric polyolefin are blended together. All the preferred features of the above-named thermoplastic elastomer composition according to the invention are also features preferred for the thermoplastic composition(s) produced or used in the process(es) according to the invention. In a preferred embodiment, the composition produced in the process according to the invention is the thermoplastic elastomer composition according to the invention.

In a further embodiment of the present invention, it is preferred that the components used in the process according to the invention are blended together at a temperature above the melting and softening point of the non-elastomeric polyolefin. The blending above the melting or softening point of the non-elastomeric polyolefin can lead to a partial cross-linking in the thermoplastic elastomer composition through polymerization of double bonds.

The present invention therefore also relates to a thermoplastic elastomer composition which has been produced by the process according to the invention, in which the components used have been blended at a temperature above the melting or softening point of the non-elastomeric polyolefin. In other words, according to the invention a composition is also intended to be covered, in which some of the components used are present cross-linked with each other for example by reaction of double bonds. However, it has been ascertained by the inventors of the present invention that the reaction of the double bonds with each other in the composition according to the invention is only incomplete, with the result that sufficient double bonds are still present for the reaction with the rubber.

The process according to the invention for producing a thermoplastic elastomer composition is described in more detail below:

The thermoplastic elastomer compositions according to the present invention can be produced by blending/mixing the components named below, A, B, C, D, E, F, G, H and I—insofar as they are present in the compositions. The mixing can take place using mixing systems known in rubber technology and plastic technology such as kneaders, internal mixers, e.g. internal mixers with intermeshing or tangential rotor geometry, as well as also in continuous mixing equipment such as mixing extruders, e.g. mixing extruders with 2 to 4 or more shaft screws (e.g. twin-screw extruders).

When carrying out the production process according to the invention it is important to ensure that the mixing temperature is sufficiently high that component C (non-elastomeric polyolefin) can be transformed into the plastic state, but is not damaged in the process. This is guaranteed if a temperature above the melting or softening temperature of component C is selected. The components—insofar as they are present in the compositions—are particularly preferably mixed at a temperature in the range from 150° C. to 320° C., preferably 160° C. to 280° C., particularly preferably 180° C. to 250° C. The period for the blending/mixing at the temperatures indicated lies in the range from 0.5 min to 2 min. The composition is then cooled to room temperature.

Before blending in the process according to the invention, the components A, B, C, D, E, F, G, H and I—insofar as they are contained in the composition according to the invention—are preferably provided jointly and intimately mixed at temperatures above the melting or softening temperatures of component C. A continuous mixing unit, such as e.g. an extruder or a twin-screw extruder, is particularly preferred for the production. By means of the named procedure, it is achieved that after the completion of production, the composition undergoes the finest and most homogeneous distribution possible of the components used.

The compositions according to the invention are outstandingly suitable for providing thermoplastic elastomers with very good properties, in particular with very good UV resistance, low friction with simultaneously very good elastic properties (compression set, elongation at break and tensile strength). Furthermore, the compositions according to the invention have very little to no tendency to the oiling-out of plasticizers. In addition they exhibit an excellent adhesion to sulphur-cross-linked rubber.

The terms "comprise", "contain" and "have" used in the present application are meant in each case where they are used to also cover the term "consist of", with the result that these embodiments are also disclosed in this application.

The components named above and used in the thermoplastic elastomer compositions according to the invention or the processes according to the invention are abbreviated by the following letters and are described in more detail below:
A: SBC with an average molecular weight of more than 70,000 g/mol
B: double bond-containing polymer with a molar proportion of double bonds in the range from 5 to 95 mol.-%
C: non-elastomeric polyolefin
D: phenolic resin
E: cross-linking auxiliary material
F: plasticizer
G: molecular sieve
H: stabilizers, auxiliary materials and dyes (additives)
I: filler Component A: SBC with an Average Molecular Weight of More than 70,000 g/mol As already described above, SBC copolymers consist of various polymer blocks, of which at least one block is a polystyrene block and at least one block is a polyolefin block. An SBC preferably has the structure of a triblock copolymer, in which the middle block is a polyolefin block, more preferably an ethylene/propylene, ethylene/butylene or isobutylene block. Further preferably, the SBC is a saturated polymer, i.e. a polymer that has either been hydrogenated or is already double bond-free directly after the polymerization.

An example of an SBC according to the invention is SEBS (polystyrene-block-poly(ethylene-co-butylene)-block-polystyrene). A further example of an SBC which can be used according to the invention and is not cross-linked is SEEPS (polystyrene-block-poly(ethylene-co-(ethylene-propylene))-block-polystyrene). In addition, further examples of SBCs which can be used according to the invention and are not cross-linked are SEPS (polystyrene-block-poly(ethylene-co-propylene)-block-polystyrene) and SIBS (polystyrene-block-polyisobutylene-block-polystyrene). Moreover, all further known SBCs which have been hydrogenated and thus contain no C—C double bonds or are already present double bond-free after the polymerization are also to be named here as examples. Furthermore, all non-hydrogenated SBCs such as for example SBS, SIS, SIBS are however also to be named as examples according to the invention. SEBS is quite particularly preferred as SBC according to the invention. Examples of hydrogenated or saturated SBCs to be used according to the invention are known by the trade names Kraton®, Septon®, Europrene®, Taipol® and Sibstar® and commercially available.

The SBC with an average molecular weight of more than 70,000 g/mol is present in the composition according to the invention preferably in a weight proportion in the range from 15 to 40 wt.-%, more preferably in the range from 20 to 35 wt.-% relative to the total weight of the composition according to the invention.

Component B: Double Bond-Containing Polymer with a Molar Proportion of Double Bonds in the Range from 5 to 95 mol.-%

The double bond-containing polymer can have double bonds in the main chain or in the side chain. The double bond-containing polymer can be a non-hydrogenated styrene block copolymer or a sulphur-cross-linkable, uncross-linked diene rubber.

As described above, by a "non-hydrogenated SBC" is meant one in which at least one polystyrene block and at least one polyolefin block are present, wherein the polyolefin block can be constructed from for example butadiene or isoprene. In the polymerization of the diene, one of the two double bonds is used for the polymerization, the other of the two double bonds remains in the polymer after the polymerization. The non-hydrogenated SBC is preferably a linear triblock copolymer.

Examples of this are SBS (polystyrene-block-polybutadiene-block-polystyrene), SIS (polystyrene-block-polyisoprene-block-polystyrene) and SIBS (polystyrene-block-poly(isoprene-co-butadiene)-block-polystyrene). Quite particularly preferably, the double bond-containing polymer is an SIS. Commercially available SBS is for example Kraton® D (Kraton), SIS is available for example from Kuraray as Hybrar®.

The diene rubbers to be understood as double bond-containing polymer according to the invention include both homopolymers of dienes, and random copolymers of at least two dienes, as well as random copolymers of different olefinic monomers, for example one or more monoolefins with one or more dienes. The term "olefin-diene rubbers" is also to be found in the literature, for the random rubber copolymers of one or more monoolefins with one or more dienes. In this invention no distinction is made between homopolymers of dienes, random copolymers of dienes and random copolymers of olefins and dienes. All the above variants are named as diene rubbers.

As double bond-containing diene rubbers according to the invention, those which are sulphur-cross-linkable are preferred. Furthermore, it is preferred that the diene rubbers are present uncross-linked in the TPE composition according to the invention.

As diene rubbers, copolymers of one or more olefins and a diene are preferred. As olefins, ethylene, propylene or butylene are preferably used here, wherein ethylene and propylene are preferred. As dienes, non-conjugated dienes are preferably used, with the result that the polymer produced has a double bond in the side chain. As diene component, dicyclopentadiene (DCP), 1,4-hexadiene or ethylidene norbornene (ENB, IUPAC: 5-ethylidene-2-norbornene) are used. The dienes differ with respect to the cross-linking speed. DCP has the lowest, ENB the highest reactivity. The diene rubber is preferably used uncross-linked according to the invention. A particularly prominent representative is the uncross-linked ethylene propylene diene rubber (EPDM). Uncross-linked EPDM is a terpolymer, synthetic rubber. EPDM belongs to the random copolymers with saturated polymer main chain framework. The production preferably takes place with metallocene or Ziegler-Natta catalysts based on vanadium compounds and aluminium alkyl chlorides. The above-named dienes are used as dienes. This type of random diene rubber is cross-linkable with sulphur, phenolically or peroxidically, wherein it is preferably used uncross-linked or only partially cross-linked according to the invention or is present in the composition according to the invention.

A homopolymer which is polymerized from a diene, preferably a conjugated diene, is named as a further preferred diene rubber. A particularly preferred example of this is isoprene rubber (IR), a synthetically produced variant of natural rubber. It differs from the latter primarily due to its somewhat lower chemical purity. This is due to the fact that the catalysts used for the polymerization have a lower effectiveness than the enzymes occurring in nature. The purity of natural rubber is preferably more than 99.9%, whereas in the case of synthetically produced IR—depending on the catalyst used—only approximately 92% to 97% is achieved. Like natural rubber, IR can also be cross-linked peroxidically, phenolically or with sulphur. The diene rubber based on homopolymers is preferably used uncross-linked or partially cross-linked according to the invention, or is present uncross-linked or partially cross-linked in the composition according to the invention.

If the double bond-containing polymer is a sulphur-cross-linkable, uncross-linked diene rubber, it is preferred that this has a molar proportion of double bonds in the range from 5 to 40 mol.-%, more preferably 7 to 20 mol.-% relative to the molar number of monomer units of the polymer.

The double bond-containing polymer is preferably used in a quantity such that the weight ratio of SBC with an average molecular weight of more than 70,000 g/mol (component A) to the double bond-containing polymer (component B) in the composition according to the invention lies in the range from 10:1 to 2:1, more preferably in the range from 8:1 to 4:1.

Component C: Non-Elastomeric Polyolefin

The non-elastomeric polyolefin used in the present invention can be any polyolefin that is suitable for the production of thermoplastic elastomer compositions. The non-elastomeric polyolefin is preferably a thermoplastic polyolefin.

The non-elastomeric polyolefin is preferably a polyethylene, a polypropylene or a copolymer of ethylene and propylene.

Polyethylenes that can be used according to the invention are for example HDPE (high density polyethylene), MDPE (medium density polyethylene), LDPE (low density polyethylene), LLDPE (linear low density polyethylene) and VLDPE (very low density polyethylene).

The propylene is preferably a homopolymer of propylene.

The copolymer of propylene and ethylene is preferably a random copolymer.

According to the invention, combinations of the named polymers can also be used.

Polyolefins suitable for the invention are above all those which are suitable for processing in injection moulding. Suitable polyolefins are those with good flow properties and rigidity.

Homopolymers of propylene (hPP) are commercially available and each of these available hPPs can be used according to the invention.

The hPP can have a melt flow index value according to ISO 1133 (at 230° C. with 2.16 kg) in the range from 0.5 g/10 min to 200 g/10 min, and preferably in the range from 4 g/10 min to 50 g/10 min; a tensile strength according to ISO 527-1, -2 in the range from 15 MPa to 50 MPa, and preferably in the range from 20 MPa to 40 MPa; an elongation at break according to ISO 527-1, -2 in the range from 1% to 500%, and preferably in the range from 10% to 300%.

Commercially available hPPs are for example products from Lyondell-Basell, which are available under the trade name Moplen®, such as Moplen® HP500N and Moplen® HP501L.

Random polypropylene copolymers (rPP) are also commercially available and each of these rPPs can be used according to the invention. Ethylene and/or butene are preferred as comonomer.

The rPP can have a melt flow index according to ISO 1133 (at 230° C. with 2.16 kg) in the range from 0.5 g/10 min to 200 g/10 min, and preferably in the range from 4 g/10 min to 50 g/10 min; a tensile strength according to ISO 527-1, -2 in the range from 15 MPa to 50 MPa, and preferably in the range from 20 MPa to 40 MPa; an elongation at break according to ISO 527-1, -2 in the range from 1% to 500%, and preferably in the range from 10% to 300%.

Polyethylenes of different densities can be used according to the invention. These are sufficiently commercially available.

Any polyethylene can be used, the melt flow index of which lies in the range from 0.5 g/10 min to 10 g/10 min. HDPE can have a melt flow index according to ISO 1133 (at 190° C. with 2.16 kg) in the range from 0.02 g/10 min to 55 g/10 min, and preferably in the range from 0.9 g/10 min to 10 g/10 min; a tensile strength according to ISO 527-1, -2 in the range from 12 MPa to 32 MPa, and preferably in the range from 20 MPa to 30 MPa; an elongation at break according to ISO 527-1, -2 in the range from 50% to 1200%, and preferably in the range from 600% to 700%.

LDPE can have a melt flow index according to ISO 1133 (at 190° C. with 2.16 kg) in the range from 0.5 g/10 min to 200 g/10 min, and preferably in the range from 0.7 g/10 min to 7 g/10 min; a tensile strength according to ISO 527-1, -2 in the range from 6 MPa to 33 MPa, and preferably in the range from 12 MPa to 24 MPa; an elongation at break according to ISO 527-1, -2 in the range from 100% to 800%, and preferably in the range from 500% to 750%.

However, it is particularly preferred according to the invention that the non-elastomeric polyolefin is one which comprises propylene in its repeat units. Even more preferably, the non-elastomeric polyolefin is an hPP.

The non-elastomeric polyolefin is preferably used in a quantity such that the weight ratio of SBC with an average molecular weight of more than 70,000 g/mol (component A) to the non-elastomeric polyolefin (component C) in the composition according to the invention lies in the range from 3:1 to 0.5:1, more preferably in the range from 2:1 to 1:1.

Component D: Phenolic Resin

Phenolic resins are used according to the invention when the composition according to the invention, in addition to the connections between the excess sulphur or sulphur-containing compounds of the cross-linking system of the rubber, is to build up yet further bonds between the rubber. The phenolic resins with double bonds of the rubber and double bonds of the double bond-containing polymer of the TPE composition according to the invention can react here. Phenolic resins that can be used according to the invention are preferably those which can form a bond with two different double bonds at at least two points of the phenolic resin with elimination of water. Brominated or chlorinated phenolic resins can also be used. In the latter case, elimination of water does not then result, but the elimination of hydrogen bromide or chloride. According to the invention, phenolic resins with sufficiently high reactivity at mixing temperatures of at least 220° C. are preferably used.

To accelerate the reaction of phenolic resins with double bonds, cross-linking agents known to a person skilled in the art, e.g. inorganic compounds are used, as described below.

Phenolic resins suitable for the cross-linking are known to a person skilled in the art and are usually obtained by reaction of phenol with aldehydes (phenol-formaldehyde resin). Phenolic resins suitable for this purpose are for example the products of the reaction of octylphenol with formaldehyde, e.g. SP-1045 H (SP-1045, HRJ-10518 H from Schenectady International Inc.), which is an octylphenol-formaldehyde resin that contains methylol groups, is suitable, or in the case of brominated phenolic resins, brominated octylphenol resins, for example those with the trade names SP-1055 or SP-1056. Suitable Cl-containing Lewis acids are known to a person skilled in the art. $SnCl_2$ or chloroprene rubber is preferably used.

The at least one phenolic resin—insofar as it is present—is preferably used in a quantity such that the weight ratio of SBC with an average molecular weight of more than 70,000 g/mol (component A) to the phenolic resin (component D) in the composition according to the invention lies in the range from 12:1 to 5:1, more preferably in the range from 10:1 to 7:1.

Component E: Cross-Linking Auxiliary Material

To accelerate and catalyze the formation of bonds between the composition according to the invention and the rubber, cross-linking auxiliary materials can be used. Inorganic acids, such as for example $SnCl_2$ and/or ZnO, are preferably used here. However, halogen-containing elastomers, such as for example chloroprene rubber, can also be used. ZnO is particularly preferably used as it also acts as catalyst.

The cross-linking auxiliary material—insofar as it is present—is preferably used in a quantity such that the weight ratio of SBC with an average molecular weight of more than 70,000 g/mol (component A) to the cross-linking auxiliary material (component E) in the composition according to the invention lies in the range from 40:1 to 10:1, more preferably in the range from 30:1 to 15:1.

Component F: Plasticizer

Suitable plasticizers are in principle known to a person skilled in the art. Suitable plasticizers according to the invention are technical or medical mineral or white oils, native oils such as for example soya or rapeseed oil, also alkylsulphonyl ester, in particular alkylsulphonyl phenyl ester, wherein the alkyl substituents contain linear and/or branched alkyl chains with >5 C atoms.

Mixtures of the substance classes described can also be used as suitable plasticizers.

An example of a commercially available plasticizer is Shell Catenex T 145 S from Shell.

The plasticizer—insofar as it is present—is preferably used in a quantity such that the weight ratio of SBC with an average molecular weight of more than 70,000 g/mol (component A) to the plasticizer (component F) in the composition according to the invention lies in the range from 1.5:1 to 0.2:1, more preferably in the range from 1:1 to 0.4:1 and even more preferably in the range from 0.8:1 to 0.6:1.

Component G: Molecular Sieve

As mentioned above, in the composition according to the invention, molecular sieves can also be used. Water-absorbing molecular sieves are preferred here. The use of molecular sieves is particularly advantageous when phenolic resins which eliminate water during cross-linking are also used in the composition according to the invention. During the reaction of these phenolic resins with double bonds, the eliminated water molecules are bound via the molecular sieve.

Thus the equilibrium is shifted in favour of the reaction product during this reaction.

The water-adsorbing molecular sieve is preferably a zeolitic material. By the term "zeolitic material" is meant standard zeolites as well as the structural analogues thereof, such as for example aluminophosphates or silicoaluminophosphates. Zeolites are generally crystalline aluminosilicates which occur in numerous modifications in nature, but can also be produced synthetically. Depending on zeolite type, these can store up to approximately 40% of their dry weight of water which is released again on heating. Since 1998, zeolites have been defined by the International Mineralogical Association as follows: "A zeolite is a crystalline substance with a structure characterized by a framework of linked tetrahedra, each consisting of four oxygen atoms surrounding a cation. This framework contains open cavities in the form of channels and cages. These are usually occupied by water molecules and extra-framework cations that are commonly exchangeable. The channels are large enough to allow the passage of guest species. In the hydrated phases, dehydration occurs at temperatures mostly below about 400° C. and is largely reversible. The framework may be interrupted by (OH, F) groups; these occupy a tetrahedron apex that is not shared with adjacent tetrahedra".

The general molecular formula of zeolites is:

$$M_{x/n}[(AlO_2)_x(SiO_2)_y] \cdot zH_2O,$$

wherein the factor n results from the charge of the metal ion, e.g. in the case of alkali metal ions n=1 and in the case of alkaline earth metal ions n=2. The factor z indicates how many water molecules have been absorbed by the zeolite. According to the so-called Löwenstein rule, the so-called y/x modulus cannot become smaller than 1. The metal M is typically a cation of an alkali or alkaline earth metal, but can also be a proton or another inorganic cation such as for example $NH_4^+$.

Zeolites have a large inner surface (in some cases up to more than 1000 m²/g) and strong electrostatic fields in the crystal framework. Because of these properties, zeolites are highly significant as adsorbents in sorption processes. An inner surface of more than 1000 m²/g can only provide a fine porous substance. This is substantially achieved by the very fine micropores. A branched pore system is characteristic. A distinction is drawn between macro-, meso-, micro- and submicropores. By "macropores" is meant pores with a pore diameter of greater than 50 nm, by "mesopores" pores with a pore diameter of 2-50 nm, by "micropores" pores with a pore diameter of 0.4-5.0 nm and by "submicropores" pores with a pore diameter of less than 0.4 nm.

For the sorption processes, the micropores and mesopores which in the case of zeolites to be used according to the invention preferably make up 50% or more of the pore volume (VDI Guideline 3674) are of significance according to the invention.

According to the invention, it is preferred that a zeolite which can store at least 20 wt.-% of its dry weight of water is used. Furthermore, it is preferred that the melting point of the zeolite is greater than the production or processing temperature of the thermoplastic elastomer composition.

Furthermore, it is preferred that the average pore size of the micropores is not greater than 3 nm, i.e. lies in the range from 0.4-3 nm. The density of the zeolite that can be used according to the invention at 20° C. preferably lies in the range from 1.9 g/cm$^3$ to 2.4 g/cm$^3$. Furthermore, it is preferred that the melting point of the zeolite is greater than 400° C.

The BET surface area of the zeolites that can be used according to the invention preferably lies in the range from 500 m$^2$/g to 1200 m$^2$/g, even more preferably from 800 m$^2$/g to 1000 m$^2$/g. According to the invention, the BET surface area is measured according to DIN ISO 9277:2003-05.

Molecular sieves that can be used according to the invention are for example available from Lanxess under the trade name Rhenogran Zeolithe 70.

The molecular sieve—insofar as it is present—is preferably used in a quantity such that the weight ratio of SBC with an average molecular weight of more than 70,000 g/mol (component A) to the molecular sieve (component G) in the composition according to the invention lies in the range from 20:1 to 8:1.

Component H: Stabilizers, Auxiliary Materials and Dyes (Additives)

Suitable additives are e.g. processing auxiliary materials, metal soaps, fatty acids and fatty acid derivatives, factice ([made-up word]: rubber-like substance which is obtained e.g. by the action of sulphur or sulphur chloride on drying oils; serves for stretching rubber), anti-ageing agents, anti-UV agents or antiozonants such as antiozonant waxes, antioxidants, e.g. polycarbodiimides (e.g. Rhenogran®, PCD-50), substituted phenols, substituted bisphenols, dihydroquinolines, diphenylamines, phenylnaphthylamines, paraphenylenediamines, benzimidazoles, paraffin waxes, microcrystalline waxes, pigments, dyes such as titanium dioxide, lithopone, zinc oxide, iron oxide, ultramarine blue, chromium oxide, antimony sulphite; stabilizers such as heat stabilizers, stabilizers against weathering; means of protection against oxidation, e.g. p-dicumyldiphenylamine (e.g. Naugard® 445), styrenated diphenylamine (e.g. Vulcanox® DDA), zinc salt of methyl mercaptobenzimidazole (e.g. Vulcanox® ZMB2), polymerized 1,2-dihydro-2,2,4-trimethylquinoline (e.g. Vulcanox® HS), thiodiethylene bis(3,5-di-tert-butyl-4-hydroxy)hydrocinnamate, thiodiethylene bis[3-(3,5-di-tert-butyl-4-hydroxyphenyl)propionate] (e.g. Irganox® 1035), lubricants, release agents, flame retardants (fire protection agents), adhesion promoters, tracers, minerals as well as crystallization accelerators and retarders.

The following can be used as processing auxiliary materials and stabilizers: antistatics, anti-foaming agents, lubricants, dispersants, release agents, anti-blocking agents, free-radical scavengers, antioxidants, biocides, fungicides, UV stabilizers, other light stabilizers, metal deactivators, in addition also additives such as foaming aids, propellants, fire protection agents, flue gas suppressors, impact resistance modifiers, adhesive agents, anti-fogging agents, dyes, colour pigments, colour masterbatches, viscosity modifiers and means for protection against ageing.

UV stabilizers and antioxidants are particularly preferably used as auxiliary materials.

Additives—insofar as they are present—are preferably used in a quantity such that the weight ratio of SBC with an average molecular weight of more than 70,000 g/mol (component A) to the additives (component G) in the composition according to the invention lies in the range from 80:1 to 20:1, more preferably in the range from 50:1 to 30:1.

Component I: Filler

Suitable fillers are e.g. soot, chalk (calcium carbonate), kaolin, siliceous earth, talc (magnesium silicate), aluminium oxide hydrate, aluminium silicate, calcium carbonate ( ), magnesium carbonate, calcium silicate, magnesium silicate, barium sulphate, zinc carbonate, calcined kaolin (e.g. Polestar® 200 P), calcium oxide, magnesium oxide, titanium oxide, aluminium oxide, zinc oxide, silanized kaolins, silanized silicate, coated chalk, treated kaolins, fumed silica, hydrophobic fumed silica (e.g. Aerosil® 972), synthetic amorphous precipitated silica (silica), carbon black, graphite, nanoscale fillers such as carbon nanofibrils, nanoparticles in platelet form or nanoscale silicon dioxide hydrates and minerals. A calcium carbonate, preferably from Bassermann minerals (Omyacarb 5 Gu), is particularly preferably used as filler.

The filler is preferably used in a quantity such that the weight ratio of SBC with an average molecular weight of more than 70,000 g/mol (component A) to the filler (component I) in the composition according to the invention lies in the range from 3:1 to 0.5:1, more preferably in the range from 2:1 to 1:1.

The present invention will now be explained in more detail by means of the following embodiment examples. The following embodiment examples are only exemplary in nature and do not serve to limit the present invention thereto.

EXAMPLES

Methods of Determination and Definitions:

The average molecular weight $M_n$ is determined by means of gel permeation chromatography, preferably with equipment from Agilent, type: PL-GPC 220 High Temperature GPC/SEC System.

The number or molar proportion of double bonds of the double bond-containing polymer is here derived or calculated from the molar number/number of the monomer units used for the polymerization and the double bonds still remaining in the polymer after the polymerization.

Determination of the density takes place according to DIN EN ISO 1183-1.

Determination of the Shore hardness takes place according to DIN EN ISO 868 and DIN ISO 7619-1.

By "tensile strength" is meant the maximum mechanical tensile stress which a material withstands before it breaks/tears. In the tensile test it is calculated from the maximum tensile force achieved relative to the original cross section of the (standardized) sample and indicated in N/mm$^2$.

The elongation at break is a material characteristic which indicates the permanent lengthening in the case of the break, relative to the initial measurement length. In material testing, elongation at break is one of many parameters and characterizes the deformation capability of a material. It is the permanent change in length $\Delta L$ relative to the initial measurement length $L_0$ of a sample in the tensile test after breaking. This change in length is indicated in %.

The compression set is a measure of how (thermoplastic) elastomers behave in the case of long-lasting, constant compression and subsequent decompression. According to DIN ISO 815 the compression set (CS) is measured at constant strain. This represents the deformation component of the test material. Many test methods for elastomers, such as e.g. tensile strength, characterize the quality and nature of the material. On the other hand, the CS is an important factor which has to be taken into account before use of a material for a specific purpose. Permanent deformation, the compression set (CS) is an important parameter, particularly for the use of seals and shims made of elastomers. In order to determine this parameter a cylindrical test piece is compressed by e.g. 25% and stored thus for a certain time at a specific temperature. The temperature and the medium (usually air, but also oils and other industrial fluids) for the compression test depend on the material to be tested, its intended purpose and the test setup (e.g. 24 h at 150° C.). 30 minutes after decompression the height is again measured at room temperature and the permanent deformation ascertained therefrom. A compression set of 0% means that the test piece has again completely reached its original thickness; a CS of 100% indicates that the test piece has been completely deformed during the test and shows no resetting. The calculation is carried out according to the following formula: CS (%)=$(L_0-L_2)/(L_0-L_1) \times 100\%$, wherein:

CS=compression set in %
$L_0$=height of the test piece before testing
$L_1$=height of the test piece during testing (spacer)
$L_2$=height of the test piece after testing.

In addition, the force in MPa according to DIN 53504/ISO 37, which is required to stretch the thermoplastic elastomer by 100%, 200% or 300%, was measured (expansion). Here a test piece—as defined in the named standard—is taken and stretched by the length indicated while measuring the force required.

Determination of the tear propagation resistance takes place according to DIN ISO 34-1.

The abrasion of the thermoplastic elastomer compositions is measured by rubbing a 6 mm high cylinder with a diameter of 16 mm over 40 m of 60-grit sandpaper with a contact pressure of 10 N.

The adhesion of the thermoplastic elastomer compositions to EPDM (type: AA6AXZ or AA7DOZ; manufacturer: Gummiwerk Kraiburg) is determined as follows: a 2 mm thick EPDM plate with the dimensions 3 cm×6 cm is overmoulded on two sides with the thermoplastic elastomer composition according to the invention. In order to determine the absolute adhesion (inlay) the force (in N) which is required to separate the EPDM from 3 cm along the edge of the thermoplastic elastomer according to the invention is measured in a tensile testing machine. In order to determine the relative adhesion (S2) so-called S2 test rods are cut out and clamped in a tensile testing machine. The force per unit area (N/mm$^2$) which is required to separate the EPDM from the thermoplastic elastomer according to the invention is determined.

By "friction" or "sliding friction" is meant the force which is required in order to move a slide with a specific test weight over a plate surface of the test plates at a constant speed. In order to determine the sliding friction, test plates made of the thermoplastic elastomer composition according to the invention with the dimensions 125 mm×125 mm×2 mm are produced by means of injection moulding. The surface obtained should be smooth, i.e. have no waves. In order to determine the friction, the test plate is clamped in a test stand. A 400 g weight with the dimensions 45 mm×30 mm×18.8 mm is provided with a glass plate on the underside over the entire surface. The weight is placed with the side of the glass plate on the test plate, and the friction is determined by means of a Zwick tensile testing machine No. Z010/TN2A according to DIN 51220, 51221, 51223, 51302 with a 2.5 kN force transducer with a manufacturer's test certificate M according to DIN 55350 Part 18, in which the weight is drawn 7 cm over the test plate. This also results in the dimensionless variables of the adhesion and sliding friction coefficient.

The so-called "Florida" test is carried out according to the Volkswagen AG group standard PV 3930.

The so-called "Kalahari" test is carried out according to the Volkswagen AG group standard PV 3929.

Embodiment Examples

Table 1 indicates the abbreviations used for the components used in the examples:

TABLE 1

| Component | Raw material |
|---|---|
| A | SBC with an average molecular weight of more than 70,000 g/mol (abbreviated to: SBC) |
| B | Double bond-containing polymer with a molar proportion of double bonds in the range from 5 to 95 mol.-% (abbreviated to: Dbcp) |
| C | Non-elastomeric polyolefin |
| D | Phenolic resin |
| E | Cross-linking agent |
| F | Plasticizer |
| G | Molecular sieve |
| H | Stabilizers, auxiliary materials and dyes (additives) |
| I | Filler |

Examples 1 to 3: Production of a Thermoplastic Elastomer Composition According to the Invention Thermoplastic elastomer compositions with the components shown in Tables 2 and 3 are produced according to the above-named production process. The SBC used in the examples is one with a molecular weight $M_n$ of >70,000 g/mol. The Dbcp used is one which is polymerized 30 wt.-% from styrene and 70 wt.-% from isoprene units, i.e. has 78 mol.-% double bonds. A twin-screw extruder is used for blending the components used. Table 4 indicates the measured mechanical values. Table 5 indicates mechanical data following hot-air ageing.

Comparison Example: Allruna® Special Type for Adhesion to Rubber

Allruna® from Allod was used as a comparison. Allruna® is based on SBC: here too, data for hot-air ageing are indicated in Table 5.

TABLE 2

| | Compositions | | | |
|---|---|---|---|---|
| Raw material | Component | Example 1 | Example 2 | Example 3 |
| SBC | A | 85 | 85 | 85 |
| Dbcp | B | 15 | 15 | 15 |
| Non-elastomeric polyolefin | C | 51 | 51 | 51 |
| Phenolic resin | D1 | 10 | | |
| | D2 | | 10 | |
| Cross-linking auxiliary material | E | 4 | 4 | 4 |

TABLE 2-continued

| | | Compositions | | |
|---|---|---|---|---|
| Raw material | Component | Example 1 | Example 2 | Example 3 |
| Plasticizer | F | 120 | 120 | 120 |
| Molecular sieve | G | | | |
| Stabilizers, auxiliary materials and dyes | H | | | |
| Additive 1 | | 10 | 10 | 10 |
| Additive 2 | | 0.79 | 0.79 | 0.79 |
| Additive 3 | | 0.41 | 0.41 | 0.41 |
| Additive 4 | | 0.41 | 0.41 | 0.41 |
| Additive 5 | | 0.34 | 0.34 | 0.34 |
| Additive 6 | | 0.34 | 0.34 | 0.34 |
| Additive 7 | | 0.17 | 0.17 | 0.17 |
| Filler | I | 50 | 50 | 50 |

TABLE 3

| | Raw materials used | | |
|---|---|---|---|
| Raw material | Component | Manufacturer | Type |
| SBC | A | Versalis (Eni Group) | Europrene ® SOLTH2315P |
| Dbcp | B | Kuraray | HYBRAR ® 5127 |
| Non-elastomeric polyolefin | C | Entec | PP HP12 |
| Phenolic resin | D1 | SI Group | RESIN HRJ-10518 H |
| | D2 | SI Group | RESIN SP 1045 H |
| Cross-linking auxiliary material | E | Bayer | ZnO aktiv |
| Plasticizer | F | Shell | Shell Catenex ® T 145 S |
| Stabilizers, auxiliary materials and dyes | H | | |
| Additive 1 | | Cabot | Plasblak ® PP6331 |
| Additive 2 | | BASF | UVA 26 |
| Additive 3 | | SABO | UV HALS 62 |
| Additive 4 | | BASF | CHIMASORB ® 944 FDL |
| Additive 5 | | BASF | AO 1330 |
| Additive 6 | | BASF | AO Phosphit |
| Additive 7 | | BASF | Irganox ® 3052 FF |
| Filler | I | BASSERMAN minerals | Omyacarb ® 5 Gu |

TABLE 4

| | Mechanical values | | | | |
|---|---|---|---|---|---|
| Value | Unit | Example 1 | Example 2 | Example 3 | Comparison example |
| Density | g/cm$^3$ | 0.998 | 1.009 | 1.003 | 0.927 |
| Hardness | ShA | 72 | 71 | 68 | 67 |
| Tensile strength | N/mm$^2$ | 11 | 10.6 | 9 | 17 |
| Elongation at break | % | 737 | 741 | 758 | 867 |
| 100% | MPa | 2.7 | 2.5 | 2.1 | 2.4 |
| 200% | MPa | 3.3 | 3.1 | 2.5 | 2.9 |
| 300% | MPa | 3.9 | 3.7 | 3.0 | 3.6 |
| Tear propagation resistance | N/mm$^2$ | 25.9 | 24.8 | 21.8 | 25.1 |
| Compression set at 70° C./22 h | % | 45.0 | 45.0 | 48.0 | 47.0 |
| Compression set at 100° C./22 h | % | 63.0 | 65.0 | 75.0 | 54.0 |
| Adhesion (S2) to EPDM (AA6AXZ) | N/mm$^2$ | 2.7 | 2.8 | 3.0 | 3.3 |
| Adhesion (inlay) to EPDM (AA6AXZ) | N | 212 | 234 | 173 | 256 |
| Adhesion (S2) to EPDM (AA7DOZ) | N/mm$^2$ | 2.9 | 2.7 | 2.8 | 3.9 |
| Adhesion (inlay) to EPDM (AA7DOZ) | N | 223 | 206 | 166 | 232 |
| Friction (400 g, dry) | N | 2.78 | 2.27 | 3.09 | 6.29 |
| Sliding friction coefficient (400 g, dry) | dimensionless | 0.71 | 0.58 | 0.79 | 1.6 |
| Adhesion friction coefficient (400 g, dry) | dimensionless | 0.73 | 0.65 | 0.68 | 1.48 |

The values for density, hardness, tensile strength, elongation at break, expansion (100%, 200%, 300%), tear propagation resistance, adhesion, friction, sliding and adhesion friction coefficient are recorded at room temperature.

TABLE 5

| Measured quantity | Treatment period | Medium | Temperature | Example 1 | Example 2 | Example 3 | Comparison example |
|---|---|---|---|---|---|---|---|
| Tensile strength (N/mm$^2$) | Start value | Air | 90° C. | 11.7 | 10.9 | 9.5 | 17.0 |
| | 9 weeks | | | 11.2 | 11.1 | 9.9 | 16.6 |
| Elongation at break (%) | Start value | | | 759 | 743 | 737 | 867 |
| | 9 weeks | | | 744 | 740 | 739 | 862 |
| Tensile strength (N/mm$^2$) | Start value | | 120° C. | 11.7 | 10.9 | 9.5 | 17.0 |
| | 9 weeks | | | 9.5 | 9.9 | 9.9 | 18.0 |
| Elongation at break (%) | Start value | | | 759 | 743 | 737 | 867 |
| | 9 weeks | | | 754 | 747 | 748 | 854 |
| Surface after ageing | 9 weeks | | 90° C. | dry | dry | dry | sticky |

TABLE 6

| Kalahari test | Assessment | Time | Example 1 | Example 2 | Example 3 | Comparison example |
|---|---|---|---|---|---|---|
| Tears | Visual | 1500 h | none | none | none | none |
| Bleeding-out of oil | Visual | 100 h | none | none | none | oils out slightly after 100 h |
| Surface | Haptic | 1500 h | dry | dry | dry | sticky |
| Adhesive edge | Visual | 1500 h | unchanged | unchanged | unchanged | Slight swelling |
| Grey scale | Visual | 1500 h | 4 | 4 | 3.5 | 4.5 |

TABLE 7

| Florida test | Assessment | Time | Example 1 | Example 2 | Example 3 | Comparison example |
|---|---|---|---|---|---|---|
| Tears | Visual | 1500 h | none | none | none | none |
| Bleeding-out of oil | Visual | 100 h | none | none | none | oils out slightly after 100 h |
| Surface | Haptic | 1500 h | dry | dry | dry | sticky |
| Adhesive edge | Visual | 1500 h | unchanged | unchanged | unchanged | Slight swelling |
| Grey scale | Visual | 1500 h | 4.5 | 4 | 4.5 | 5 |

The invention claimed is:

1. A thermoplastic elastomer composition, comprising:
   a styrene block copolymer (SBC) with a number average molecular weight of more than 70,000 g/mol,
   a double bond-containing polymer with a molar proportion of double bonds in a range from 5 to 95 mol.-% relative to monomer units of the double bond-containing polymer,
   a non-elastomeric polyolefin, and
   a phenolic resin,
   wherein a weight ratio of the SBC to the double bond-containing polymer lies in a range from 8:1 to 4:1.

2. The composition according to claim 1, wherein the SBC is a double bond-free SBC.

3. The composition according to claim 1, wherein the SBC is a linear triblock copolymer.

4. The composition according to claim 1, wherein the SBC contains a polyolefin block.

5. The composition according to claim 1, wherein the double bond-containing polymer is a non-hydrogenated styrene block copolymer or a sulphur-cross-linkable, uncross-linked diene rubber.

6. The composition according to claim 5, wherein the double bond-containing polymer is a non-hydrogenated styrene block copolymer and has a molar proportion of double bonds in the range from 50 to 90 mol.-%, or wherein the double bond-containing polymer is a sulphur-cross-linkable, uncross-linked diene rubber and has a molar proportion of double bonds in the range from 5 to 40 mol.-%, in each case relative to the monomer units of the double bond-containing polymer.

7. The composition according to claim 1, wherein the phenolic resin is based on octylphenol.

8. The composition according to claim 1, further comprising at least one of:
   a plasticizer,
   a cross-linking auxiliary material,
   a molecular sieve,
   a stabilizer,
   an auxiliary material,
   a dye, and
   a filler.

9. A method of producing a composite material, comprising:
   preparing a thermoplastic elastomer composition including:
     a styrene block copolymer (SBC) with a number average molecular weight of more than 70,000 g/mol, a double bond-containing polymer with a molar proportion of double bonds in a range from 5 to 95 mol.-% relative to monomer units of the double bond-containing polymer, and a non-elastomeric polyolefin, and adhering the thermoplastic elastomer composition to a rubber based on cross-linked diene rubber mixtures, wherein a weight ratio of the SBC to the double bond-containing polymer lies in a range from 8:1 to 4:1.

10. An article comprising:

a thermoplastic elastomer composition including:

a styrene block copolymer (SBC) with a number average molecular weight of more than 70,000 g/mol, a double bond-containing polymer with a molar proportion of double bonds in a range from 5 to 95 mol.-% relative to monomer units of the double bond-containing polymer, and a non-elastomeric polyolefin; and a rubber based on cross-linked diene rubber mixtures, wherein the thermoplastic elastomer composition adheres to the rubber, and wherein a weight ratio of the SBC to the double bond-containing polymer lies in a range from 8:1 to 4:1.

11. A process for producing a thermoplastic elastomer composition, comprising:

blending together:

a styrene block copolymer (SBC) with an average molecular weight of more than 70,000 g/mol, a double bond-containing polymer with a molar proportion of double bonds in a range from 5 to 95 mol.-% relative to a molar number of all monomer units of the double bond-containing polymer used for the polymerization, a non-elastomeric polyolefin, and a phenolic resin, wherein a weight ratio of the SBC to the double bond-containing polymer lies in a range from 8:1 to 4:1.

12. The process according to claim 11, wherein the blending takes place at a temperature above a melting point, a softening point, or the softening and the melting point of the non-elastomeric polyolefin.

13. A thermoplastic elastomer composition obtained through the process according to claim 12.

14. The composition according to claim 4, wherein the polyolefin block is an ethylene/propylene block or an ethylene/butylene block.

15. The composition according to claim 5, wherein the double bond-containing polymer is a styrene-isoprene-styrene block copolymer, an uncross-linked EPDM, or an isoprene rubber.

16. The article according to claim 10, wherein the rubber based on the cross-linked diene rubber mixtures is EPDM.

* * * * *